July 24, 1962 E. S. MOYER 3,045,652
BRAKE BOOSTER
Filed Oct. 28, 1959 4 Sheets-Sheet 1

INVENTOR.
Elton S. Moyer
BY
D. C. Staley
His Attorney

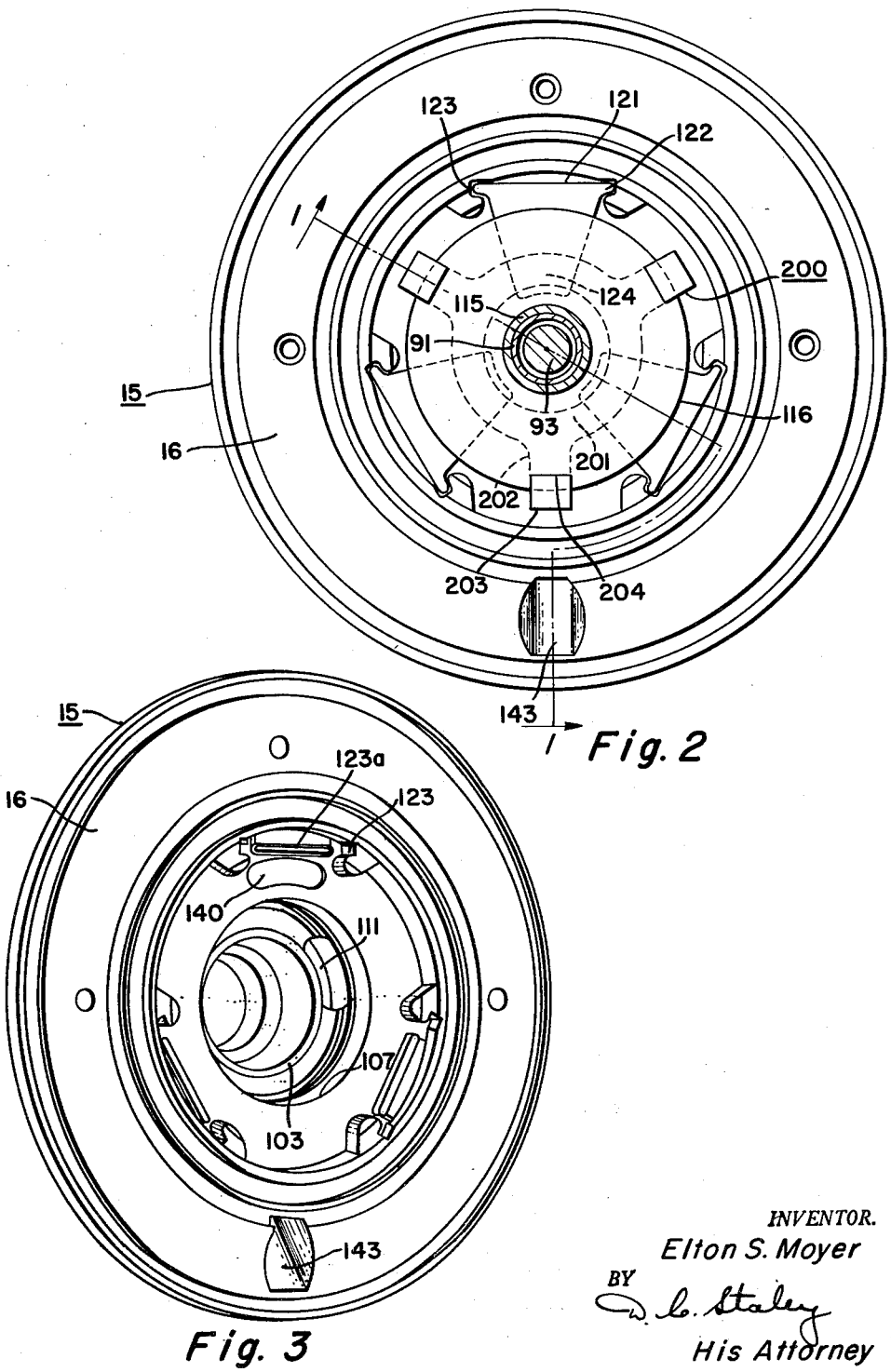

July 24, 1962

E. S. MOYER 3,045,652

BRAKE BOOSTER

Filed Oct. 28, 1959

INVENTOR.
Elton S. Moyer
BY
C. D. C. Staley
His Attorney though the power wall of the pressure producing device is arranged so that it can take over the major portion of the effort required in applying the brakes of the vehicle.

3,045,652
BRAKE BOOSTER
Elton S. Moyer, Dayton, Ohio, assignor to General Motors Corporation, Detroit, Mich., a corporation of Delaware
Filed Oct. 28, 1959, Ser. No. 849,237
4 Claims. (Cl. 121—41)

This invention relates to pressure producing devices adapted for use on motor vehicles to aid the operator of the vehicle in applying the brakes and thereby relieve, to a large extent, the manual effort normally required in applying the brakes.

These pressure producing devices or brake booster units as they are known conventionally in the art, usually consist of a container having a movable wall structure positioned therein for reciprocable movement in the container, the movable wall structure dividing the container into two compartments, one on each side of the movable wall. One of the compartments is adapted normally to have one pressure value, usually atmospheric pressure therein on one side of the wall. The compartment on the opposite side of the wall is adapted to be exposed to the same pressure value, atmospheric pressure, or be exposed to a pressure value less than atmosphere, such as the vacuum obtain from the manifold of an engine of a vehicle, to produce thereby a pressure differential on opposite sides of the movable wall that causes the wall to be moved by the higher pressure in the direction of the lower pressure. The degree of pressure differential on opposite sides of the movable wall is regulated by a control valve operated by the operator of the vehicle that regulates the degree of vacuum or less than atmospheric pressure established at one side of the movable wall. The movable power wall is usually connected with the master cylinder of the hydraulic brake system of the motor vehicle so that when a pressure differential is effective on the movable wall or power wall to produce a power movement of the wall, the power wall moves the master cylinder piston under action of the higher pressure applied to the movable wall to displace hydraulic fluid from the master cylinder into the hydraulic brake system and thence into the wheel cylinders to apply the hydraulic brakes of the vehicle under the power effect of the movable wall of the pressure producing device.

The degree of pressure differential established on opposite sides of the movable wall or power wall is regulated by the operator of the vehicle in accordance with the degree of braking effort desired by the operator and the amount of movement of the brake pedal. The movement of the brake pedal actuates the control valve of the pressure producing device in a manner to control the degree of pressure reduction on one side of the power wall of the pressure producing device and thereby control the pressure differential effective on the power wall and the value of the power effort applied into the brake effort for displacing hydraulic fluid into the brake system of the vehicle.

The pressure producing devices or brake boosters, as conventionally provided, on the commercial market are also arranged so that if the pressure producing device should fail to operate for any reason, the master cylinder piston will be actuated by direct manual operation through a direct mechanical connection with the brake pedal of the vehicle.

Pressure producing devices, or brake boosters, that are used conventionally on motor vehicles are also constructed and arranged with mechanism adapted to transmit a brake reaction effect to the foot of the operator so that the operator obtains a "feel" of physically applying the brakes of the vehicle. The reaction effect transmitted through the reaction means of the pressure producing device operates against the physical force applied by the operator of the vehicle through the brake pedal with the result that this opposing reaction force working against the physical force applied by the operator gives the operator a "feel" of applying the brakes. The reaction mechanism is constructed and arranged so that only a part of the actual brake applying force is transmitted to the foot of the operator as "brake feel" in a predetermined proportion to the actual brake pressure.

The reaction force produced while the master cylinder piston displaces hydraulic fluid from the master cylinder is partially transmitted to the movable wall or power wall of the pressure producing device or to some stationary part of the device, only a predetermined portion of the reaction effect being transmitted to the valve control member of the pressure producing device and thereby to the foot of the operator. The operator therefore feels only a small portion of the total reaction effect with the result the physical force of applying the brakes by the operator is greatly reduced, and the full effect of power operation of the pressure producing device is utilized in applying the brakes.

There have been continuous development efforts in pressure producing devices or brake boosters for use on passenger vehicles in applying the brakes of the vehicle whereby effort on the part of the operator of the vehicle is reduced in applying the brakes, particularly in that portion of the applying stroke in the initial movement of the brake pedal wherein the brake shoes are brought into contact with the brake drum to give the operator of the vehicle a soft pedal feel, at least until the power effect of he pressure producing device is available for power actuation of the master cylinder piston.

It has been considered undesirable during the initial stage of movement of the brake pedal for the operator to have a substantial "feel" of brake effort, because during the initial brake pedal movement, the brake shoes are only being moved into engagement with the brake drum with no actual brake effort occurring at the brakes. Any substantial reaction or opposing force applied to the foot of the operator during this initial portion of the brake operation gives the operator a false "feel" of brake application.

It is the desire of the designers of brake boosters for brake systems on passenger vehicles, trucks and buses to give the operator of the vehicle a "light" or "soft" brake pedal "feel" during the initial movement of the brake pedal, at least until the control valve of the pressure producing device has been moved sufficiently in response to the brake pedal movement as to establish an initial pressure differential on opposite sides of the power wall, whereupon power movement of the master cylinder piston by the power wall of the pressure producing device can take over the major portion of the effort in applying the brakes of the vehicle.

Efforts to provide the operator of the vehicle with a "soft" pedal during the initial application of the brake of the vehicle has resulted, in some instances, in completely preventing any reaction effect from being applied against the foot of the operator or opposing the operator's physical force during the initial stage of operation of the brake pedal and to allow reaction force to reach the foot of the operator for imparting brake "feel" only after a positive pressure differential is applied to opposite sides of the power wall of the pressure producing device, thereby placing the master cylinder piston under control of the power wall. Such arrangements can result in such free movement of the brake pedal that the operator obtains a "feel" of a completely free-swinging brake pedal resulting in loss of confidence in the brake system, unless such devices are very carefully engineered and designed.

Even then, subsequent adjustment of the brakes can develop the same fault.

It is, therefore, an object of this invention to provide a pressure producting device to aid the physical force of the operator of the vehicle to apply the brakes wherein the reaction system for the device is effective at all times in the full brake applying stroke of the device to transmit reaction force or reaction effect to the foot of the operator at a controlled ratio wherein the major part of the available reaction effect is transmitted to the movable wall or to a stationary part of the device, and only a small portion of the reaction effect is transmitted to the foot of the operator; and wherein, a force applying means is effective on the reaction transmitting means to resist its movement until a predetermined reaction force is developed in the pressure producing device during the initial portion of the brake applying stroke so that the reaction effect transmitted to the foot of the operator as brake "feel" during the initial portion of the brake applying stroke will be reduced, but wherein, after a predetermined reaction force is developed in the pressure producing device, the reaction effect will be transmitted to the foot of the operator as a predetermined proportion of the total reaction effect created in the device.

The arrangement is such as to provide for substantially no reaction force being transmitted to the foot of the operator as brake "feel" during the initial portion of the brake applying stroke when the operator first moves the brake pedal of the vehicle to actuate the valve mechanism of the pressure producing device, but wherein reaction "feel" can be transmitted to the foot of the operator as soon as the pressure differential is created on opposite sides of the movable wall of the pressure producing device but with a portion of the reaction effect being transmitted to the control device and thereby to the foot of the operator being counteracted by a resilient force applying means to reduce the total reaction effect transmitted to the foot of the operator in that portion of the brake applying stroke immediately following the point at which pressure differential is created on the power wall of the pressure producing device, so that the operator of the vehicle will have a "soft" pedal "feel" until a predetermined pressure differential is created on the movable wall of the pressure producing device or until a predetermined reaction effect is produced in the device.

It is, therefore, another object of this invention to provide a pressure producing device or brake booster having a mechanical leverage ratioing reaction system for transmitting the portion of the reaction effect to the movable wall of the pressure producing device with a predetermined proportion of the reaction effect being transmitted to the control member of the device as brake "feel" to the operator of the vehicle, the mechanical leverage reaction system having included therein a resilient member or spring adapted to apply its force on the lever system in a manner to retain the lever system in collapsed or ineffective position until a predetermined pressure differential is created on opposite sides of the power wall of the pressure producing device or until a predetermined reaction effect is created in the device, thereby counteracting a part of the reaction effect during the initial portion of the brake applying stroke to give the operator of the vehicle a "soft" pedal "feel."

Further objects and advantages of the present invention will be apparent from the following description, reference being had to the accompanying drawings wherein preferred embodiments of the present invention are clearly shown.

In the drawings:

FIG. 2 is a transverse cross-sectional view of the pressure producing device of FIG. 1 taken substantially along line 2—2 of FIG. 1.

FIG. 3 is an elevational view in perspective of the power wall of the pressure producing device on which the reaction levers are supported.

Figure 1:
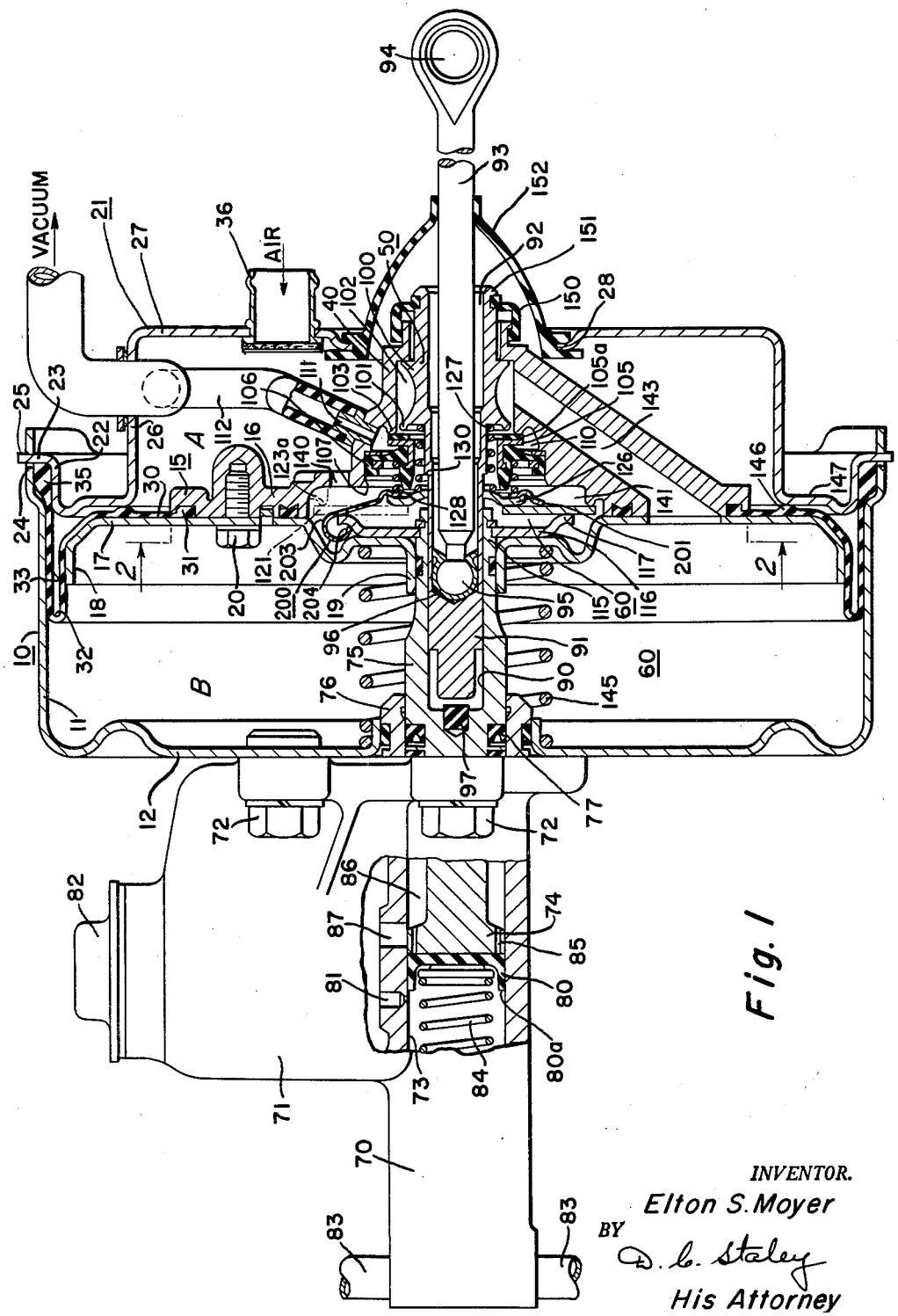
FIG. 1 is a vertical cross-sectional view of a pressure producing device or brake booster incorporating features of this invention taken along line 1—1 of FIG. 2.

In this invention the pressure producing device or brake booster consists of a cylindrical cup-shaped member 10 having the cylindrical annular wall 11 and a stationary bottom wall 12 as a continuous part of the member 10. A movable wall or power wall 15 is positioned within the cylindrical member 10 and consists of a generally annular casting 16 and a sheet metal cup-shaped member 17 having an annular outer flange 18 and an inner annular flange 19. The cup-shaped member 17 is secured to the casting member 16 by means of suitable bolts 20. A generally cylindrical cup-shaped member 21 closes the open end of the member 10 and consists of an annular flange 22 that terminates in a radial flange 23 that locks in engagement with the annular flange 24 on the member 10 by means of bayonet locking members 25. The closure member 21 also consists of an axially extending annular wall 26 that terminates in a radially extending wall 27 that terminates in an opening 28.

A diaphragm member 30, which has a cylindrical form when in the relaxed or noninstalled position in the brake booster, has one end 31 thereof secured between the cup-shaped member 17 and the casting wall 16 to form a fluid seal arrangement and secure the diaphragm to the movable wall 15. The diaphragm 30 follows generally the contour of the cup-shaped member 17 and returns upon itself from the looped end 32 with the portion 33 of the diaphragm lying against the inside wall of the annular portion 11 of the member 10, the wall portion 33 of the diaphragm terminating in an enlarged portion 35 that is retained between the annular flange 24 and the annular flange 22 and locked in position by the bayonet locking members 25 to seal the interior of the pressure producing device against leakage.

The pressure movable wall or power wall 15 divides the housing or container formed by the members 10 and 21 into two chambers A and B, the chamber A being continuously connected with atmosphere through the air inlet connection 36 provided in the wall portion 27 of the member 21. The chamber B is adapted to be exposed to atmospheric pressure or to a pressure below atmosphere, such as that received from the manifold of a motor vehicle on which the brake booster is installed, so that when the chamber B is exposed to the low-pressure source, or vacuum source, there will be a pressure differential created at opposite sides of the pressure wall or power wall 15, the higher atmospheric pressure existing in chamber A and the lower pressure existing in chamber B whereby the power wall is urged to move in a left-hand direction, as viewed in FIG. 1, when the pressure differential exists on opposite sides of the power wall 15.

The casting member 16 of the power wall 15 has an axially extending projection 40 integral therewith forming a hollow chamber that receives an operator operated control valve 50 and a reaction device or mechanism 60. The operator operated control valve 50 regulates the degree of pressure differential existing on opposite sides of the diaphragm 30 by controlling the degree of low pressure or vacuum supplied to the chamber B through the valve control structure in a manner hereinafter described.

The reaction device or mechanism 60 controls proportioning of reaction pressure received from the master cylinder of the brake system between the power wall 15 and the operator operated control valve 50 so as to proportion the reaction effect created in the master cylinder for transmission to the power movable wall 15 and to the control valve 50 and thereby to the foot of the operator to transmit a controlled proportion of the reaction effect as "brake feel" from the brake system, all of which is hereinafter more fully described.

The wall portion 12 of the cylindrical member 10 carries a master cylinder 70 and a reservoir 71 for the master cylinder. The reservoir and master cylinder are secured to the stationary wall 12 by means of the bolts or stud fasteners 72. The master cylinder 70 has an annular bore 73 in which the master cylinder piston 74 reciprocates. The master cylinder piston 74 has the end portion 75 that extends into the chamber B of the pressure producing device or brake booster. The master cylinder piston, consisting of the forward end portion 74 and the rear end portion 75, is journaled in the master cylinder 73 and in the bearing portion 76 that extends rearwardly from the reservoir and master cylinder casting. Suitable annular seals 77 are provided between the portion 75 of the master cylinder piston and the bearing portion 76 to prevent loss of hydraulic fluid from the master cylinder 73 into the brake booster chamber B, and also prevent air pressure or vacuum from entering the master cylinder.

The master cylinder piston 74 has a cup seal 80 on the forward end thereof engaging the cylinder bore 73, and when in the fully retracted position, as shown in FIG. 1, the forward edge of the cup seal is rearwardly of the port 81 that connects the master cylinder 73 with the reservoir 71. Thus, when the master cylinder piston is in fully retracted position, when the brakes are released, the master cylinder 73 is under the same atmospheric pressure as the reservoir chamber 71, a suitable vent port (not shown) being provided in the filler cap 82 for the reservoir. A conventional residual pressure check valve (not shown) is provided in the forward end of the master cylinder 73 to allow displacement of the hydraulic fluid from the master cylinder into the brake lines 83 when the master cylinder piston 74 is moved in a left-hand direction, either under control of the pressure producing device or under direct manual control in a manner hereinafter described. The check valve provided in the forward end of the master cylinder 73 also allows return of the brake fluid from the brake lines 83 back into the master cylinder in conventional manner and thence into the reservoir 71 when the brakes are allowed to move to retracted position, but conventionally provides for retention of a small residual pressure in the brake lines 83 to prevent any possibility of air entering the brake lines. A compression spring 84 placed within the master cylinder has one end engaging the cup seal 80 on the forward end of the master cylinder piston 74 and has the opposite end engaging the residual pressure check valve in the forward end of the master cylinder to urge the piston 74 into its retracted position, as shown in FIG. 1, when the brake pedal is released by the operator of the vehicle. Passages 85 are provided in the master cylinder piston connecting the chamber 86 around the master cylinder piston with the port 87 in the bottom wall of the reservoir to prevent cavitation in the master cylinder 73 on sudden retraction of the piston 74 in a right-hand direction on release of the brake pedal by the operator.

The extension portion 75 of the master cylinder piston 74 that projects into the chamber B of the pressure producing device has an axial bore 90 that slidably receives the forward end 91 of the manually operable control member 50. The control member 50 has an axial bore 92 that receives the actuating rod 93 that projects exteriorly of the pressure producing device and has the connection 94 on the end thereof by which the actuating rod is connected to the brake pedal system of the vehicle for direct actuation by the operator. The forward end of the actuating rod 93 has a spherical element 95 received within a retaining member 96 for holding the actuating rod within the bore 92 in the manually operable control member 50. The control member 50 also forms a valve element for controlling the degree of low pressure or vacuum supplied to the chamber B of the pressure producing device. The forward end of the bore 90 in the extension element 75 of the master cylinder has a rubber bumper 97 that may be engaged by the forward end of the control member 50 for direct and positive manual operation of the master cylinder piston 74 in the event the pressure producing device or brake booster should fail to operate for any reason.

The operator operated control member 50 consists of a valve element 100 that has an annular valve seat 101 on the forward face thereof. The valve element 100 operates within a chamber 102 provided in the extension portion 40 of the casting member 16. The forward end of the wall forming the chamber 102 has a valve seat 103 on which a valve element 105 is adapted to seat when the device is in the position illustrated in FIGS. 1 and 4. Also as illustrated in FIGS. 1 and 4 the seat 101 is disengaged from the valve element 105 when the brake booster is in retracted position.

The valve element 105 also includes a radially extending diaphragm supporting flange 106 that seats within the recess 107 in the extension 40 of the casting element 16.

Figure 4:
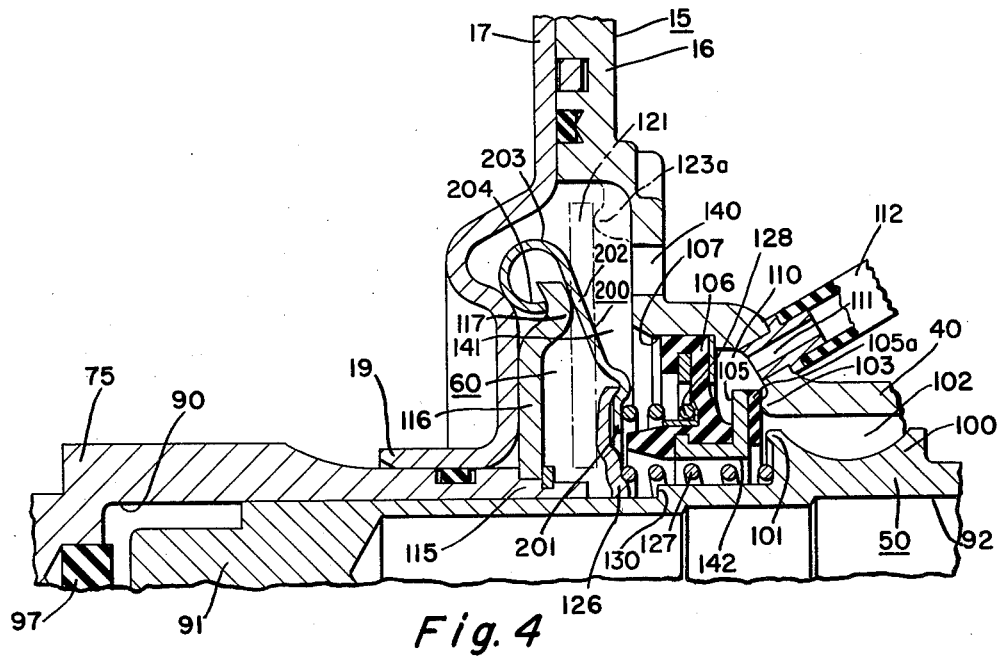
FIG. 4 is an enlarged view of a part of the pressure producing device particularly illustrating a reaction system which is shown in neutral or brake released position, the reaction lever being shown in phantom with dot-dash lines.

The diaphragm portion 106 of the valve element 105 together with the valve element 105 seating on the seat 103, forms an annular chamber 110 around the periphery of the valve element 105 but which is closed or sealed off from the chamber 102 when the valve member 105 is in the position illustrated in FIGS. 1 and 4.

The chamber 110 has an inlet connection 111 connected with a flexible pipe line 112 that, in turn, is connected with the manifold of the vehicle on which the device is installed to provide a low-pressure source or vacuum source for supply to the chamber 110. The connection of the manifold of the engine with the chamber 110 will maintain the chamber constantly at low-pressure value or at vacuum value depending upon the value of the low pressure in the manifold of the engine.

The rearward end portion 115 of the master cylinder plunger has a sliding fit with the annular flange 19 of the cup-shaped member 17 and carries a radial member 116 in the form of a disk that has the peripheral portion thereof formed arcuately to form an annular seat 117 forming a pivot axis.

A plurality of levers 121 are pivotally supported on the casting element 16 in the manner illustrated in FIGS. 2 and 3.

Each of these lever members 121 is in the form of a T-shaped element with the end portions 122 being received in recesses 123 in the casting element 116, the ledge portion 123a providing the fulcrum whereby the lever members 121 are pivotally supported on the casting element 16. The stem portion 124 of the lever members 120 extends toward the axis of the device, as shown in FIGS. 1 and 2.

The inner ends of the stem portions 124 of the levers 121 engage a reaction disk member 126 that is slidably carried on the plunger portion 91 of the operator operated control member 50.

A compression spring 128 extends between the reaction disk member 126 and the valve element 105 of the operator operated control member 50 and a second compression spring 127 extends between the disk 126 and the valve element 100. The compression spring 127 retains the control member 50, and specifically the valve element 100, in the position illustrated in FIGS. 1 and 4 with the seat 101 disengaged from the valve element 105 when the brake booster or pressure producing device is in inactive or retracted position. The spring 128 retains the valve element 105 on the seat 103 and thereby closes the chamber 110 against connection with the internal chambers of the pressure producing device.

The springs 127 and 128 also operate to retain the disk member 126 normally out of engagement with the shoulder 130 formed on the extension portion 91 of the operator operated control member 50 and between the forward end portion thereof and the valve element portion 100, and are therefore in the reaction system for transmitting reaction effect to the control member 50 whenever pressure is produced in the master cylinder 73.

A spring member 200 engaging both the reaction disk 116 and the reaction disk 126 urging the two disks axially toward one another and against the reaction levers 121 at opposite sides thereof, as shown in FIGS. 1 and 4. The spring member 200 is in the form of an annular ring 201 from the peripheral edge of which three spring fingers 202 extend radially, as shown in FIG. 2. The annular ring portion engages the reaction disk 126. The finger portions 202 extend between adjacent reaction levers 121 and terminate in the return bend portions 203 that have their terminus ends 204 engaging the arcuate portion of the reaction disk 116.

The spring member 200 is formed in a manner as to tend to flatten out. Thus, when it is in assembled position, as shown in FIGS. 1 and 4, the reaction disks 116 and 126 are urged toward one another against the reaction levers 121 and resists movement of the reaction disk 126 away from the reaction disk 116 by the inner ends 124 of the reaction levers 121.

With the elements of the pressure producing device in the position illustrated in FIG. 1, which is the retracted or inactive position, chambers A and B will both be at atmospheric pressure with chamber A receiving its air through the inlet connection 36. Chamber B is connected with chamber A at this time through the port 140, annular chamber 141, through the clearance provided in the opening 142 in the valve element 105 and thence between the seat 101 and the valve element 105 and chamber 102 which connects with the port 143 and chamber B. At this time therefore both chambers A and B are under the same atmospheric pressure so that the return spring 145 provided between the wall 12 and the movable wall 15 retains the movable wall 15 in the position shown with the resilient stop nubs 146 engaging the radial wall portion 147 of the closure member 21.

A rubber seal member 150 is provided between the end portion 151 of the manually operated control member 50 and the end of the casting extrusion 40 to prevent air from entering the chamber 102 when the chamber is under low pressure or vacuum conditions in a manner hereinafter described. A rubber dirt cover member 152 is provided between the manual control rod 93 and the wall 21 of the brake device.

Under conditions just previously mentioned with atmospheric pressure existing in chambers A and B through the passages heretofore outlined, low pressure or vacuum is retained in the chamber 110 that is connected with the vacuum source consisting of the manifold of the engine of the vehicle.

Figure 5:
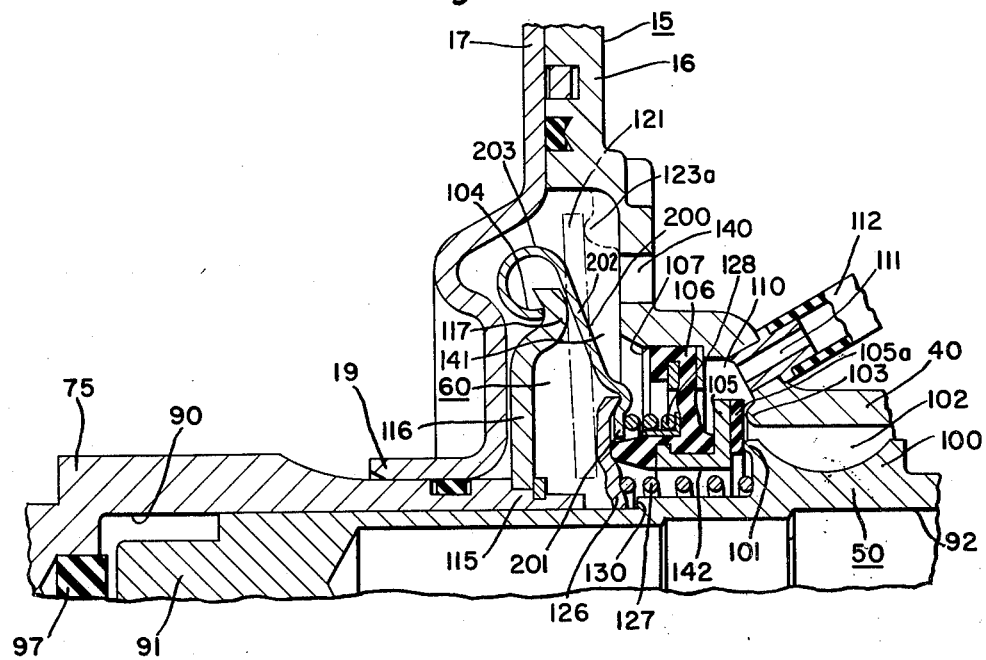
FIG. 5 is an enlarged cross-sectional view similar to FIG. 4 but with the members of the reaction system illustrated in position immediately following the initiation of the power stroke of the movable wall of the pressure producing device, the reaction lever being shown in phantom with dot-dash lines.
Figure 6:
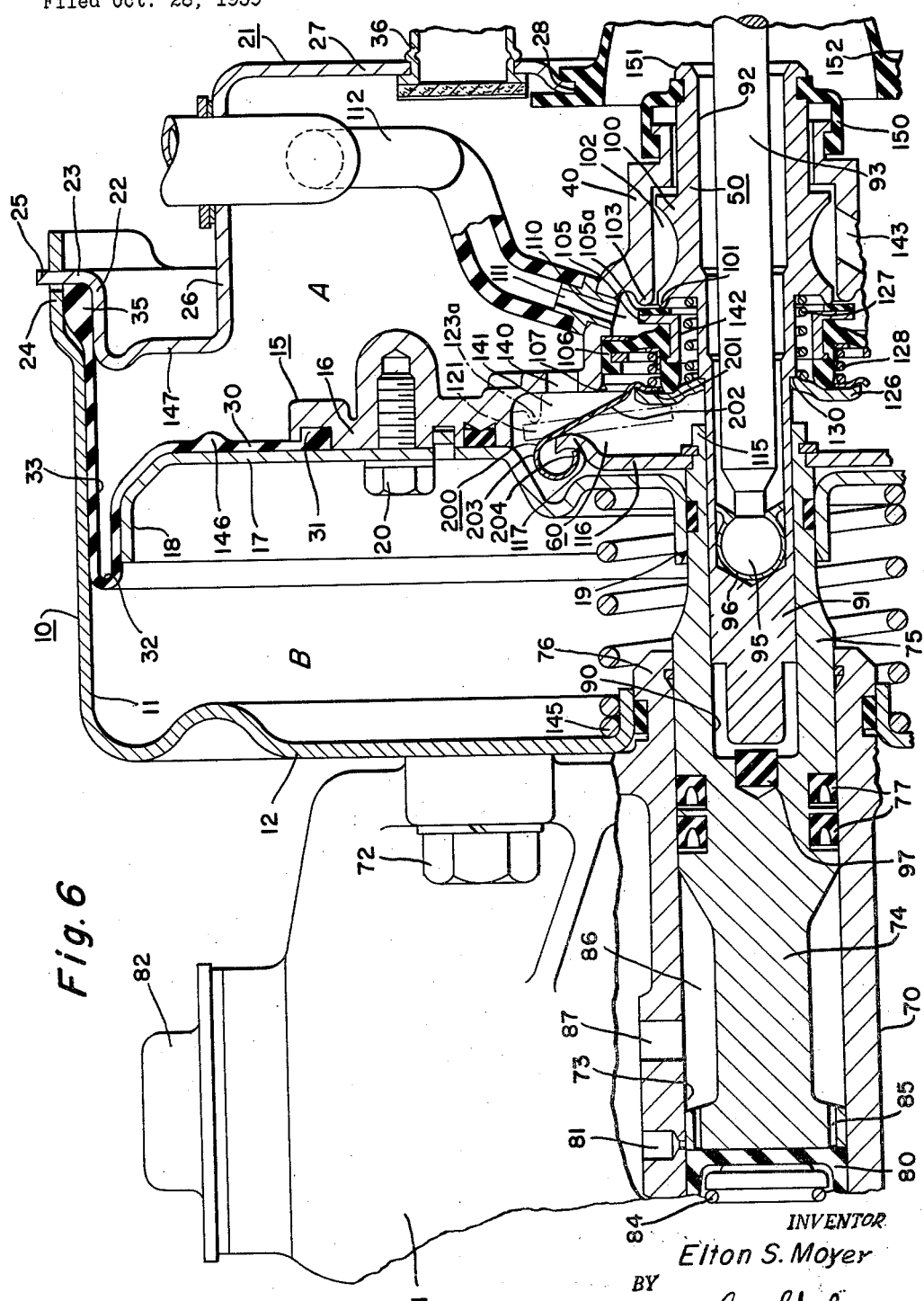
FIG. 6 is a cross-sectional view similar to FIGS. 4 and 5, but illustrating the reaction system in position for maximum transfer of reaction effect to the control member of the device, the reaction lever being shown in phantom with dot-dash lines.

Referring more particularly to FIGS. 4, 5 and 6 that are enlarged views of the reaction system and the manually operable control valve that regulates movement of the power wall 13, and at this time disregarding the spring member 200, the operation of the device is as follows.

When the operator of the vehicle begins a brake application the first minute movement of the brake pedal under control of the foot of the operator moves the actuating rod 93 in a left-hand direction, as viewed in the several figures, a sufficient distance to cause the seat 101 on the valve member 100 to engage the seat element 105a of the valve element 105. At this time spring 127 is the only force opposing the movement of the member 50 by the operator. The manually operated control member 50 is freely slidable in the bore 90 of the master cylinder piston end portion 75. However, under this operation the left-hand end of the plunger extension 91 of the valve member 50 will not engage the bumper member 97, this engagement being reserved for failure of the power device.

This initial leftward movement of the manually operated control member 50, to effect engagement of the valve seat 101 with the seat element 105a, will not cause any movement of the master cylinder piston 74 because the compression force of the spring 84 is sufficient to retain the piston 74 in the position illustrated in FIG. 1, and the sliding friction between the member 91 and the end portion 75 of the master cylinder piston is insufficient to overcome the force effect of the spring 84.

At the time the seat 101 on the manually operated control member 50 engages the seat element 105, connection of chamber B with chamber A is broken by this valve closing engagement so that chamber 102 is now isolated from chamber A while it is still in connection with chamber B through port 143.

A slight additional movement of the control member 50 by the operator of the vehicle moves the manually operated member 50 in a slightly further left-hand direction until the seat element 105 is lifted from the seat 103 on the casting member 16, as shown in FIG. 5. When this occurs the low pressure or vacuum existing in chamber 110 is connected with the chamber B of the brake booster through the clearance between the seat 103 and the valve seat element 105a, this clearance passage being connected with the chamber 102 and it, in turn, with the chamber B through the port passage 143.

As soon as low pressure or vacuum is available to chamber B for withdrawing atmospheric air from this chamber and reducing its pressure, a pressure differential is established between chambers A and B with the atmospheric pressure in chamber A urging the power wall or movable wall 15 of the brake booster in a left-hand direction against the action of the spring 145.

Initial movement of the power wall 15 in a left-hand direction causes left-hand movement of the master cylinder piston 74 because of the mechanical connection made between the master cylinder piston and the power wall 15 through the valve element 105, the springs 128 and 127, and the reaction system 60, with the result the forward end 80a of the cup seal 80 on the master cylinder piston 74 moves toward the port 81 between the master cylinder 73 and the reservoir until this port is closed.

During the initial portion of the applying stroke just mentioned, in which the valve element 100 seats upon the valve element 105 and valve element 105 lifts from the seat 103 and the master cylinder piston moves forward to close the port 81, no hydraulic pressure is developed in the master cylinder 73 because the port 81 is fully open so that any fluid displaced from the master cylinder piston will pass through the port 81 into the reservoir to maintain the master cylinder under atmospheric pressure.

However, during that portion of the initial applying stroke following the slight opening of the vacuum passage between valve element 105a and the valve seat 105, the pressure differential established between chambers A and B is sufficient to overcome the effect of the retraction spring 145 in the brake booster and, together with the foot applied effort on member 50, overcomes the retraction spring 84 in the master cylinder so that the forward movement of the master cylinder piston to close port 81 is under the power effect of the power wall 15 and the foot effort of the operator applied to member 50. Thus the operator of the vehicle does not feel this initial movement of the master cylinder piston to close port 81 during the portion of the applying stroke because the force effect of spring 84 is not sufficient to overcome the force effect of springs 127 and 128 at this time. All the operator has felt thus far is the force of the light spring 127 when closing valve seat 101 onto the valve element 105a and of spring 128 on lifting valve element 105 from its seat 103.

However, when the port 81 in the master cylinder 73 is closed by the forward lip of the lip seal 81 on the master cylinder piston 74, hydraulic pressure will be developed in the master cylinder 73 on continued leftward movement of the piston 74 under action of the power wall 15 with the result the pressure increases internally in the master cylinder to displace the hydraulic fluid into the brake system to move the brake shoes into engagement with the brake drum, this being the purpose of initial displacement of hydraulic fluid from the master cylinder into the brake lines and the wheel cylinders of the hydraulic brake system on the vehicle.

When hydraulic pressure increases in the master cylinder 73, a counter force effect tends to urge the master cylinder piston in a right-hand direction against the action of the power wall 15. When this occurs this counter force effect or reaction effect is transmitted rearwardly through the master cylinder piston extension 75 to the disk member 116 or reaction disk as it can be referred to herein. This reaction disk 116 engages the levers 121 at a point radially inwardly of their pivot axis 123a on the casting member 116 with the result the reaction force or reaction effect transmitted by the disk 116 is divided proportionately between the power wall 16 and the reaction disk 126 carried on the member 91. The reaction force is therefore proportioned between the power wall 15 and the reaction element 126 so that only a part of the reaction effect is transmitted through the springs 127 and 128 to the manually operated control member 50 to be felt by the operator as brake applying "feel" or pressure. The initial reaction force thus transmitted to the control member 50 in this initial portion of the brake applying stroke is not sufficient to move the reaction disk 126 against the compression force of springs 127 and 128. Thus the initial reaction effect or force is relatively light and the brake pedal force required from the operator to set the device into operation is light so that a "soft" initial pedal is provided for the operator.

As soon as the value of the reaction force, or proportion of reaction force, transmitted by the levers 121 through the reaction disk 126 is equivalent to and slightly exceeds the force effect of the springs 127 and 128, the reaction levers 121 will move gradually in a right-hand or counterclockwise direction about their pivot axis on the casting element 16 as the reaction effect increases to thereby move the reaction disk 126 in a right-hand direction, as viewed in the respective figures, against the compression of the springs 127 and 128 that are both now being supported by the valve member 100, which, in turn, is supported by the foot of the operator by means of its connection through the applying rod 93 that is connected to the brake pedal of the vehicle. Thus, any reaction force created or which is the result of hydraulic pressure developing in the master cylinder 73 is transmitted to the foot of the operator of the vehicle as brake "feel" as soon as any hydraulic pressure overcomes the force effect of springs 127 and 128.

As soon as the initial reaction force or effect overcomes the effect of springs 127 and 128 there is produced an initial movement of the reaction disk 116, the levers 121 and the reaction disk 126 moving to their positions illustrated in FIG. 5.

As the reaction effect increases as a result of increase of hydraulic force in the master cylinder 73 produced by an increase of the force required in brake application, the force value of the reaction effect transmitted to the reaction disk 126 in the manner heretofore described will further compress the springs 127 and 128 until the reaction disk 126 engages the shoulder 130 on the plunger member 91. The result is that the initial reaction effect transmitted as brake "feel" to the foot of the operator is resiliently taken by the springs 128 and 127, and, as soon as the reaction force is sufficient to overcome the effect of the springs 127 and 128, the reaction effect is then positively mechanically transmitted to the member 91 through the connection between the reaction disk 126 engaging the shoulder 130 as a predetermined proportion of the total reaction effect. At this time the operator of the vehicle is receiving reaction effect from the master cylinder piston in a predetermined direct proportion to the force required to apply the brakes and in direct proportion to the pressure differential on opposite sides of the power wall 15, and also thereby in direct proportion to the pressure valve in the chamber B as controlled by the manually operated control member 50.

Referring now to the action of the spring member 200 placed between the reaction disk 116 and the reaction disk 126, which modifies the operation of the brake booster just described in the following manner.

Spring member 200 urges the reaction disk 126 toward the reaction disk 116 against opposite sides of the reaction members or levers 121 with a predetermined force value so that the force effect of the spring 200 must be overcome by an equivalent force effect transmitted from the reaction member 116 to the reaction member 126 by way of the reaction levers 121 before the reaction member 126 will move in a right-hand direction against the force effect of the springs 127 and 128. The spring 200 will therefore delay the movement of the reaction disk 126 toward the shoulder 130 on the manually operated control member 50 so that the transfer of a predetermined proportion of the total reaction effect is delayed until the force effect of the spring 200 is overcome by a sufficient increase of reaction effect from the master cylinder.

Thus, in the initial portion of the brake applying stroke when the manually operated control member 50 is moving toward the valve element 105 to engage seat 101 with the valve element 105 and to lift valve element 105 from the seat 103 the operator of the vehicle is feeling only the force effect of the springs 128 and 127 in the manner heretofore described.

As the reaction force is transmitted through the reaction disk 116 to the reaction levers 121, the reaction effect will not be required to overcome the force effect of spring 200 to effect its expansion before the reaction disk 126 will move in a right-hand direction against the shoulder 130 of the manual control member as shown in FIG. 6. While reaction force is continuously transmitted to the foot of the operator of the vehicle as brake "feel" through the springs 127 and 128 in the manner heretofore described, yet the force effect of spring 200 tending to prevent movement of the reaction member 126 into engagement with the shoulder 130 of the manual control member 50 delays or retards the application of a higher reaction effect against the control member 50 to a later time in the brake applying stroke. The result is that the operator of the vehicle is provided with a "light" or "soft" pedal "feel" during a greater portion of the initial applying stroke than would occur if the spring 200 were not present in the reaction system. In fact, the higher proportioning effect of transfer of reaction effect to the manual control member 50 is sufficiently delayed in the brake applying stroke that the brake shoes of the hydraulic brakes will be in positive engagement with the brake drums; and a brake application will have been initiated, the transition from an extremely light pedal pressure produced by the force effect of the springs 127 and 128 being gradually increased as the reaction effect gradually overcomes the force effect of spring 200 until the reaction disk 126 engages the shoulder 130 on the manual control member 50 to provide a direct proportioning effect for transmission of the reaction effect between the movable wall 15 and the control member 50.

While the embodiments of the present invention as herein disclosed constitute a preferred form, it is to be understood that other forms might be adopted.

What is claimed is as follows:

1. A pressure producing device in which physical force is supplemented by power assistance, comprising, a power cylinder, a pressure responsive movable wall in the power cylinder, an operator operated control member to control the operation of a movable wall, a reaction member arranged to exert a reaction force varying with variations in force exerted by the movable wall, lever means actuated by said reaction member and arranged to transmit a portion of the reaction effect applied to the lever means by the reaction member to said control member, resilient means between said lever means and said control member transmitting reaction effect from said lever means to said control member, and additional force applying means operatively effective concurrently on both said reaction member and said lever means continuously counteracting a portion of the reaction effect from the lever means to prevent the operator from feeling the total reaction effect from the lever means during an initial portion of the pressure providing stroke.

2. A pressure producing device in which physical force is supplemented by power assistance, comprising, a power cylinder, a pressure responsive movable wall in the power cylinder, an operator operated control member to control the operation of a movable wall, a reaction member arranged to exert a reaction force varying with variations in force exerted by the movable wall, lever means actuated by said reaction member and arranged to transmit a portion of the reaction effect applied to the lever means by the reaction member to said control member, spring means between said lever means and said control member transmitting reaction effect from said lever means to said control member, and additional spring means operatively effective concurrently on both said reaction member and said lever means resisting movement of the said lever means by the said reaction member until a predetermined reaction force is applied by the reaction member to the lever means to counteract thereby a portion of the reaction effect from the lever means during an initial portion of the pressure producing stroke to prevent the operator from feeling the total reaction effect from the lever means.

3. A pressure producing device in which physical force is supplemented by power assistance, comprising, a power cylinder, a pressure responsive movable wall in the power cylinder, an operator operated control member to control the operation of a movable wall, a reaction member arranged to exert a reaction force varying with variations in force exerted by the movable wall, lever means actuated by said reaction member and arranged to transmit a portion of the reaction effect applied to the lever means by the reaction member to said control member, said lever means and said control member being arranged for mechanical engagement therebetween to establish through the lever means a predetermined ratio of reaction effect applied to the lever means by the reaction member for transmission to the said control member, spring means between said lever means and said control member normally holding said lever means out of mechanical engagement with said control member and providing for transmission of reaction effect from said lever means to said control member until the reaction effect increases sufficiently to overcome the effect of said spring means, and additional spring means operatively effective concurrently on both said reaction member and said lever means restraining movement of said lever means relative to said reaction member until a predetermined reaction force is applied to the said lever means by the said reaction member.

4. A brake booster for applying a brake of a vehicle in which physical force is supplemented by power assistance, comprising, a power cylinder, a pressure responsive movable wall in the power cylinder, an operator operated control member to control operation of the movable wall, reaction means comprising a lever system arranged to exert a reaction force varying with variations in force exerted by the movable wall and proportion the reaction effect transmitted thereby between the movable wall and the control member whereby a part of the reaction effect is transmitted to the operator as brake "feel," said lever system comprising a first and a second reaction member disposed on opposite sides of a proportion lever, spring means engaging both said first and second reaction members to effect movement thereof toward one another and against said proportioning lever on opposite sides thereof whereby to restrain movement of one of said reaction members relative to the other by said proportioning lever means, and resilient means between said lever system and said control member for transfer of available reaction effect from said lever system to said control member.

References Cited in the file of this patent

UNITED STATES PATENTS

| | | |
|---|---|---|
| 2,735,268 | Stelzer | Feb. 21, 1956 |
| 2,800,770 | Edge et al. | July 30, 1957 |
| 2,826,041 | Rike | Mar. 11, 1958 |
| 2,832,316 | Ingres | Apr. 29, 1958 |
| 2,867,193 | Ayers | Jan. 6, 1959 |
| 2,894,490 | Ingres | July 14, 1959 |